Nov. 26, 1968    D. F. WRIGHT    3,413,551
INDUCTION DEVICES HAVING LOW SIDE THRUST
Filed June 22, 1964
Fig. 1
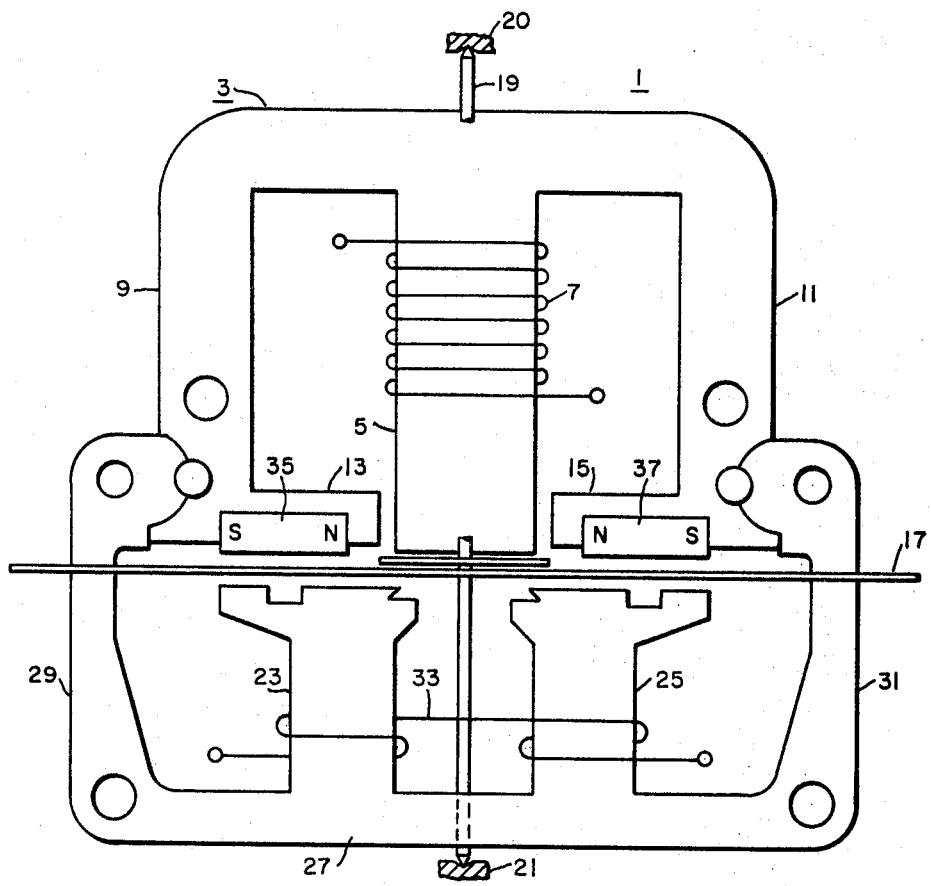
PRIOR ART    Fig. 2
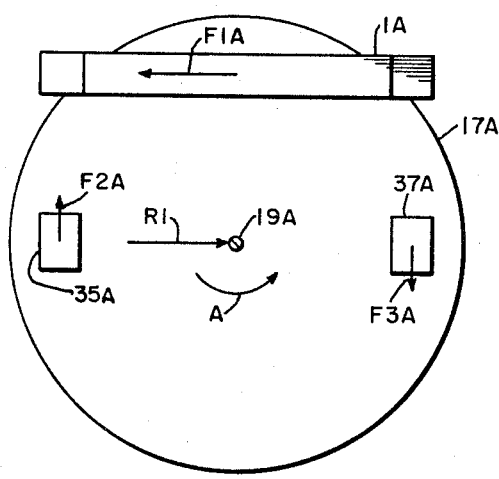
Fig. 3
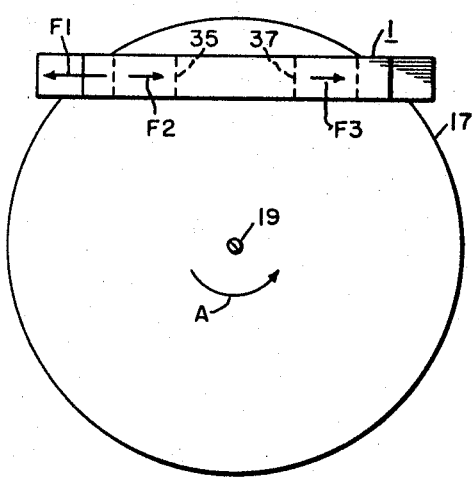

United States Patent Office 3,413,551
Patented Nov. 26, 1968

3,413,551
INDUCTION DEVICES HAVING LOW
SIDE THRUST
David F. Wright, Housecreek Township, Raleigh, N.C.,
assignor to Westinghouse Electric Corporation, East
Pittsburgh, Pa., a corporation of Pennsylvania
Filed June 22, 1964, Ser. No. 376,911
7 Claims. (Cl. 324—152)

ABSTRACT OF THE DISCLOSURE

Induction devices such as watthour meters have voltage and current poles and permanent damping magnets all located in a common plane to minimize side thrust.

---

This invention relates to electric motors and is herein illustrated as applicable to a specific example of an induction motor of the type frequently used in integrating watthour meters.

Electric motors of the type here under discussion frequently comprise a magnetic pole system acting on a conductive armature having a shaft and bearings which limit the armature to rotation about a vertical axis, the armature being usually a flat disk of conducting material. To provide the motor with a restraint that controls the armature speed of rotation a unidirectional magnetic field is also provided, frequently in the form of a permanent magnet assembly, which has a flux passing vertically through the armature disk. In the prior commercial devices with which I am familiar, it has been necessary to displace the effective position of the unidirectional magnet field from the effective position of the induction flux causing the rotation of the disk. This displacement between the positions of the unidirectional magnet flux and the induction motor flux due to the alternating current driving forces results in the application of substantial side thrust to the armature shaft. The bearings for the ends of the armature shaft are made so that they prevent radial movement of the motor shaft from its desired position, but the friction of the shaft against the bearings results in wear and extra loading of the motor, and in the case of certain types of such motors, particularly those employed in meters of the integrating watthour meter type, this friction and the radially-directed forces which cause it are highly undesirable. This is particularly true in the case of motors which have a floating type of magnetic bearing at one or the other end of the shaft.

In accordance with the present invention I provide a type of unidirectional damper magnet which it is possible to so position that its flux substantially coincides, as it passes through the armature, with the position of the driving flux impressed on the armature by the alternating current windings of the motor; and this substantially reduces, if not completely abolishing, the radially-directed forces acting on the bearings.

An object of my invention is accordingly to provide an improved type if damping flux, and the mechanism or the arrangement for producing it, for damping the rotation of an electric motor.

Another object is to provide a new and improved type of electric induction motor having a rotatable armature with a damping flux arrangement which minimizes the lateral thrust on the bearings of the armature.

Still another object of my invention is to provide a new and improved type of induction meter of the integrating watthour meter type which is particularly adapted for operation with bearings of the floating-magnet type.

The foregoing and other objects of this invention will become apparent upon reading the following description, taken with the drawing wherein:

FIGURE 1 in rear elevation with parts broken away illustrates the invention by showing the magnetic circuit and armature and other pertinent components of an induction-type integrating watthour meter;

FIG. 2 is a view in top plan showing relations of components in a prior art induction-type watthour meter; and FIG. 3 is a view in top plan showing relations of components in the meter of FIG. 1.

Referring in detail to the drawing the magnetic circuits of an induction meter 1 of the watthour meter type comprise a potential magnet portion 3 having a potential pole piece or central limb 5 embraced by the potential windings 7 typically found in watthour meters. On each side of the central limb 5 are side limbs 9 and 11 substantially coplanar therewith which terminate at their lower ends in horizontal members 13 and 15. The potential magnet structure just described may be composed of stacked sheets of soft magnet steel each of the general shape so far described and this will result in a magnetic flux in the region between the lower ends of the limbs 5, 9 and 11 through the air gap adjacent to these ends.

A disk-type armature 17, supported on a shaft 19 having an upper bearing 20 and a lower bearing 21, is parallel to the three faces of the magnet core portions 5, 13 and 15. As a result of this construction the flux set up in the potential core magnets, 5, 9 and 11 will in part pass through the armature 17.

The lower section of the entire magnet structure comprises two vertically extending current pole pieces or arms 23 and 25 directly below the central area of the armature 17 and joined by a lower yoke 27 from the ends of which upright limbs 29 and 31 extend and make junctions with the side members 9 and 11 of the potential core magnet. A current winding 33 of the type conventional in induction watthour meter structures produces a magnetic flux extending around the magnetic circuit 23, 27, 25 and across the air gap passing through the armature 17 and into the bottom portions 5, 13 and 15 of the potential magnet core. Part of the potential flux from the potential winding 7 passes through the central member 5, the two side members 9 and 11 of the potential portion of the magnetic core and through the horizontal portions 13 and 15 thereof into the central member 5. Other portions of the magnetic flux from the potential winding pass through the armature 17 by way of a magnetic circuit 5, 23, 29, 9 and a magnetic circuit 5, 25, 31, 11. This magnetic flux reacts with the current-derived magnetic flux from the current cores 23 and 25 to produce rotation of the armature 17 in the manner well known in the electrical watthour meter art.

The limbs 23 and 25 of the current magnetic circuit are extended outwardly from the central portion of the meter in which the shaft 19 is positioned so that they form broad magnetic pathways for a magnetic flux passing from the lower faces of the potential magnetic core portion down through the air gap and the armature 17 into the limb 23 of the current magnetic core and from the portion 15 of the potential magnetic core downward to the magnetic air gap and the armature 17 into the limb 25 of the current magnetic core. In the portions 13 and 15 of the potential magnetic structure are inset permanent magnets 35 and 37 preferably composed of a non-metallic ferromagnetic substance having north poles N and south poles S. I have found oriented barium ferrite to be excellent for this purpose.

The potential magnetic core 3 and the current magnetic core portion including limbs 29, 23, 25, 31 and 27 are, as in prior art magnet structures for induction meters of the watthour type, substantially coplanar. It will be seen from the drawing that the magnetic flux of the permanent magnetic inserts 35 and 37 find a closed path, except for the air gap and the armature 17, through the limbs 23, 29 and 13 for permanent magnet 35 and 25, 31 and 15 for the permanent magnet insert 37. Permanent magnet inserts 35 and 37 have a high coercive force and they will retain the greater part of their magnetic strength notwithstanding any demagnetizing effect of the magnetic driving fluxes due to the potential winding 7 and the current winding 33; and because of their high specific resistivity the fluctuations of the flux due to windings 7 and 33 will not induce currents of deleterious amount in the permanent magnets.

Since the magnetic fields due to the permanent magnets 35 and 37, which provides the damping forces on the armature 17, is substantially coincident in position with the magnetic fields due to the windings 7 and 33 which produce the driving force on the armature 17 there will be substantially no radially-directed force on the shaft 19.

The forces acting on the shaft 19 will be considered with particular reference to FIG. 3. When the potential and current windings of the meter 1 are energized a force F1 is produced in a conventional manner acting between the meter electromagnet and the armature 17 to urge the armature and its shaft about their common axis in the direction of the arrow A. The permanent magnets 35 and 37 develop damping forces F2 and F3 having magnitudes dependent on the rate of rotation of the armature relative to the permanent magnets. The production of such damping forces by rotation of an electroconductive armature relative to a permanent magnet is well understood in the art.

By inspection of FIG. 3 it will be noted that the damping forces F2 and F3 are aligned with the driving force F1. When the armature 17 reaches the rate of rotation called for by the force F1, the difference between this force and the sum of the forces F2 and F3 is small. Inasmuch as the forces have a common line of action the side thrust applied thereby to the bearings 20 and 21 is also small. The elimination of side thrust is highly desirable.

By way of contrast, FIG. 2 shows the arrangement of components in a typical commercial prior-art induction-type watthour meter. In FIG. 2 each component is identified by the reference character employed for the similar component of FIG. 3 to which the suffix A is added.

The electromagnet of FIG. 2 is similar to that of FIG. 3 except that the permanent magnets have been removed from the electromagnet and are replaced by permanent magnets 35A and 37A located on opposite sides of the shaft 19A.

In FIG. 2 a driving force F1A is produced which is similar to the driving force F1 of FIG. 3. However, the permanent magnets 35A and 37A develop damping forces F2A and F3A which form a couple. In the embodiment of FIG. 2 the force F1A applies a side thrust to the bearings for the shaft 19A and these bearings must develop a reaction force R1 equal in magnitude and opposite in direction to the force F1A. This loading of the bearings introduces serious problems into the performance of the bearings such as the problem of wear.

As a general rule non-metallic ferromagnetic materials have a higher specific resistivity than metals such as steel; hence they are more suitable for permanent magnets 35 and 37 than the latter.

Preferably, the magnetic paths for magnetic flux provided in the meter 1 are so proportioned that they will not be saturated with either alternating or direct magnetic fluxes under service conditions.

Although the invention has been described with reference to certain specific embodiments thereof numerous modifications falling within the spirit and scope of the invention are possible.

I claim as my invention:

1. In an induction device, a stator structure, a rotor structure mounted for rotation relative to the stator structure, said rotor structure comprising an electroconductive armature, said stator structure comprising a magnetic core having soft magnetic voltage and current pole means disposed in a common plane and defining an air gap in which a portion of said armature is positioned, said pole means having pole faces bordering said air gap, voltage and current widing means coacting with said voltage and current pole means respectively for establishing a shifting magnetic field in said air gap acting inductively to rotate said armature when energized respectively in accordance with the voltage and current of an alternating current circuit, and damping means comprising a permanent magnet having north and south poles located substantially in said common plane, said north and south poles bordering one side of said air gap.

2. A device as claimed in claim 1 wherein said permanent magnet has a resistivity which is high compared to the resistivity of steel.

3. A device as claimed in claim 1 wherein said magnetic core has a soft magnetic part positioned across the air gap from said permanent magnet to provide a return path for magnetic flux passing between said north and south poles through said air gap.

4. A device as claimed in claim 3 wherein said voltage pole means and the permanent magnet are located on a first side of the air gap, said current pole means and said soft magnetic part being integrally connected and located on a second side of the air gap.

5. A device as claimed in claim 1 wherein said voltage pole means comprises an E-shaped soft magnetic unit with the free ends of the three legs bordering the first side of the air gap, said center leg constituting a main voltage pole, said current pole means comprising a pair of soft magnetic current poles having pole faces bordering the second side of said air gap, said damping means comprising first and second permanent magnets secured respectively to the outer legs of said E-shaped soft magnetic unit, each of the permanent magnets having north and south poles located substantially in said common plane and bordering the first side of the air gap, each of said current poles having a portion spaced across the air gap from a separate one of the permanent magnets to provide a return path for magnetic flux passing between the north and south poles of the associated permanent magnet through said air gap.

6. A device as claimed in claim 5 wherein said voltage winding means coacts with the magnetic core for directing magnetic flux through the center leg of the E-shaped soft magnetic unit and through the outer legs of said unit in parallel by paths clear of said air gap and said permanent magnets.

7. A device as claimed in claim 5 wherein said current winding means coacts with the magnetic core for directing magnetic flux through said current poles and through the air gap by paths clear of said permanent magnets.

References Cited

UNITED STATES PATENTS 2,698,917  1/1955  Van Urk et al. ___ 324—152 X

FOREIGN PATENTS 752,439  7/1956  Great Britain.
1,046,180  12/1958  Germany.

RUDOLPH V. ROLINEC, *Primary Examiner.*

A. E. SMITH, *Assistant Examiner.*